United States Patent
Kanzawa et al.

(10) Patent No.: US 11,372,091 B2
(45) Date of Patent: Jun. 28, 2022

(54) SYSTEMS AND METHODS FOR CORRECTING PARALLAX

(71) Applicant: Toyota Research Institute, Inc., Los Altos, CA (US)

(72) Inventors: Yusuke Kanzawa, Ann Arbor, MI (US); Junya Ueno, Ann Arbor, MI (US); Mark Edward Tjersland, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 409 days.

(21) Appl. No.: 15/929,143

(22) Filed: Jun. 28, 2019

(65) Prior Publication Data

US 2020/0408888 A1 Dec. 31, 2020

(51) Int. Cl.
| | |
|---|---|
| *G01S 7/497* | (2006.01) |
| *G01S 17/87* | (2020.01) |
| *G01S 17/66* | (2006.01) |
| *G01S 17/86* | (2020.01) |
| *G01S 17/931* | (2020.01) |
| *G06V 20/58* | (2022.01) |

(52) U.S. Cl.
CPC ............ *G01S 7/4972* (2013.01); *G01S 17/66* (2013.01); *G01S 17/86* (2020.01); *G01S 17/87* (2013.01); *G01S 17/931* (2020.01); *G06V 20/58* (2022.01)

(58) Field of Classification Search
CPC ...... G01S 7/4972; G01S 17/931; G01S 17/86; G01S 17/87; G01S 17/66
See application file for complete search history.

(56) References Cited

U.S. PATENT DOCUMENTS

| 5,559,695 A * | 9/1996 | Daily ...................... G01S 11/12 345/501 |
| 7,974,442 B2 | 7/2011 | Camus et al. |
| 9,128,185 B2 | 9/2015 | Zeng |
| 9,129,211 B2 | 9/2015 | Zeng |
| 2010/0066587 A1 | 3/2010 | Yamauchi et al. |
| 2010/0235129 A1 | 9/2010 | Sharma et al. |
| 2015/0100555 A1* | 4/2015 | Tremblay .............. G06F 16/168 707/693 |
| 2021/0256260 A1* | 8/2021 | Kaneko ................ G06K 9/6232 |

FOREIGN PATENT DOCUMENTS

WO 20170122529 A1 7/2017

* cited by examiner

*Primary Examiner* — Bryan Bui
(74) *Attorney, Agent, or Firm* — Christopher G. Darrow; Darrow Mustafa PC (57) ABSTRACT

In one embodiment, a system for correcting parallax error is provided. An image is received from a camera and a plurality of points is received from a LiDAR sensor. The points are placed on the image based on coordinates associated with each point. The image is divided into a plurality of cells by placing a grid over the image. For each cell, a minimum distance between the points in the cell and the camera is determined. For each cell, a margin is calculated based on the determined minimum distance. For each cell, points that have a distance from the camera that is greater than the minimum distance plus the margin are removed or deleted. The image and/or the remaining points are then used to provide one or more vehicle functions.

20 Claims, 5 Drawing Sheets

SYSTEMS AND METHODS FOR CORRECTING PARALLAX

TECHNICAL FIELD

The subject matter described herein relates, in general, to systems and methods for correcting parallax error when combining LiDAR sensor data and camera data, and, in particular, to using a grid to selectively delete LiDAR data to correct parallax error.

BACKGROUND

LiDAR sensors are popular sensors for use in autonomous and semi-autonomous vehicles. A LiDAR sensor measures the distance to a target by illuminating the target with a pulse laser, and measuring the reflected pulses. Differences in return times and wavelengths for the pulses can then be used to generate a 3D representation of the target. Often, LiDAR sensors include a plurality of lasers, with each laser outputting a pulse laser at a different angle.

Often data from LiDAR sensors is combined with data received from other sensors to generate a more complete view of a vehicle environment. For example, LiDAR sensor data may be combined with image data taken by one or more cameras associated with the vehicle.

One drawback associated with such combined sensor data is known as parallax error. Because the LiDAR sensors and cameras are often placed at different locations on a vehicle, they may have different perspectives or views of the environment of the vehicle. These different perspectives may cause parallax error where the data received from each sensor does not align correctly. Such parallax error may result in poor performance when the combined data is used for vehicle navigation, hazard detection, and other vehicle functions.

SUMMARY

In one embodiment, a system for correcting parallax error is provided. An image is received from a camera and a plurality of points is received from a LiDAR sensor. The points are placed on the image based on coordinates associated with each point. The image is divided into a plurality of cells by placing a grid over the image. For each cell, a minimum distance between the points in the cell and the camera is determined. For each cell, a margin is calculated based on the determined minimum distance. For each cell, points that have a distance from the camera that is greater than the minimum distance plus the margin are removed or deleted. The image and the remaining points are then used to provide one or more vehicle functions.

As will be described further below, the system corrects parallax error by removing points from cells that are farther away from the camera. As may be appreciated, parallax error increases the farther away the points are from the camera. By calculating the margin for a cell such that the margin decreases as the minimum distance increases, the system favors removing more points that are farther from the camera than points that are close to the camera. This results in reducing parallax error while removing the fewest number of overall points.

In an embodiment, a system for correcting parallax error is provided. The system includes one or more processors and a memory communicably coupled to the one or more processors. The system further includes a correction module including instructions that when executed by the one or more processors cause the one or more processors to: receive an image from a camera associated with a vehicle; receive a plurality of points from a sensor associated with the vehicle, wherein each point of the plurality of points is associated with a position in the image and a distance; divide the image into a plurality of cells, wherein each point of the plurality of points is associated with a cell of the plurality of cells based on the position of the point in the image; for each cell of the plurality of cells, determine a point associated with the cell having a minimum distance for the cell; for each cell of the plurality of cells, calculate a margin for the cell based on the minimum distance for the cell; for each cell of the plurality of cells, delete points associated with the cell whose associated distance is greater than the minimum distance for the cell plus the margin for the cell; and use the points associated with the cells of the plurality of cells for one or more vehicle functions.

Embodiments may include some or all of the following features. The one or more vehicle functions may include hazard avoidance and navigation. The vehicle may be an autonomous vehicle. The margin for a cell may be inversely related to the minimum distance for the cell. The distance associated with a point may be the distance from the point to the camera. Using the points associated with the cells of the plurality of cells for one or more vehicle functions may include using the points associated with the cells of the plurality of cells and the image for or one or more vehicle functions. The sensor may be a LiDAR sensor.

In an embodiment, a method for correcting parallax error is provided. The method includes: receiving an image from a camera associated with a vehicle; receiving a plurality of points from a sensor associated with the vehicle, wherein each point of the plurality of points is associated with a position in the image and a distance; dividing the image into a plurality of cells, wherein each point of the plurality of points is associated with a cell of the plurality of cells based on the position of the point in the image; for each cell of the plurality of cells, determining a point associated with the cell having a minimum distance for the cell; for each cell of the plurality of cells, calculating a margin for the cell based on the minimum distance for the cell; for each cell of the plurality of cells, deleting points associated with the cell whose associated distance is greater than the minimum distance for the cell plus the margin for the cell; and using the points associated with the cells of the plurality of cells for one or more vehicle functions.

Embodiments may include some or all of the following features. The one or more vehicle functions may include hazard avoidance and navigation. The vehicle may be an autonomous vehicle. The margin for a cell may be inversely related to the minimum distance for the cell. The distance associated with a point may be the distance from the point to the camera. Using the points associated with the cells of the plurality of cells for one or more vehicle functions may include using the points associated with the cells of the plurality of cells and the image for one or more vehicle functions. The sensor may be a LiDAR sensor.

In an embodiment, a non-transitory computer-readable medium for correcting parallax error is provided. The medium including instructions that when executed by one or more processors cause the one or more processors to: receive an image from a camera associated with a vehicle; receive a plurality of points from a sensor associated with the vehicle, wherein each point of the plurality of points is associated with a position in the image and a distance; divide the image into a plurality of cells, wherein each point of the plurality of points is associated with a cell of the plurality of cells based on the position of the point in the image; for each cell of the plurality of cells, determine a point associated with the cell having a minimum distance for the cell; for each cell of the plurality of cells, calculate a margin for the cell based on the minimum distance for the cell; for each cell of the plurality of cells, delete points associated with the cell whose associated distance is greater than the minimum distance for the cell plus the margin for the cell; and using the points associated with the cells of the plurality of cells for one or more vehicle functions.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
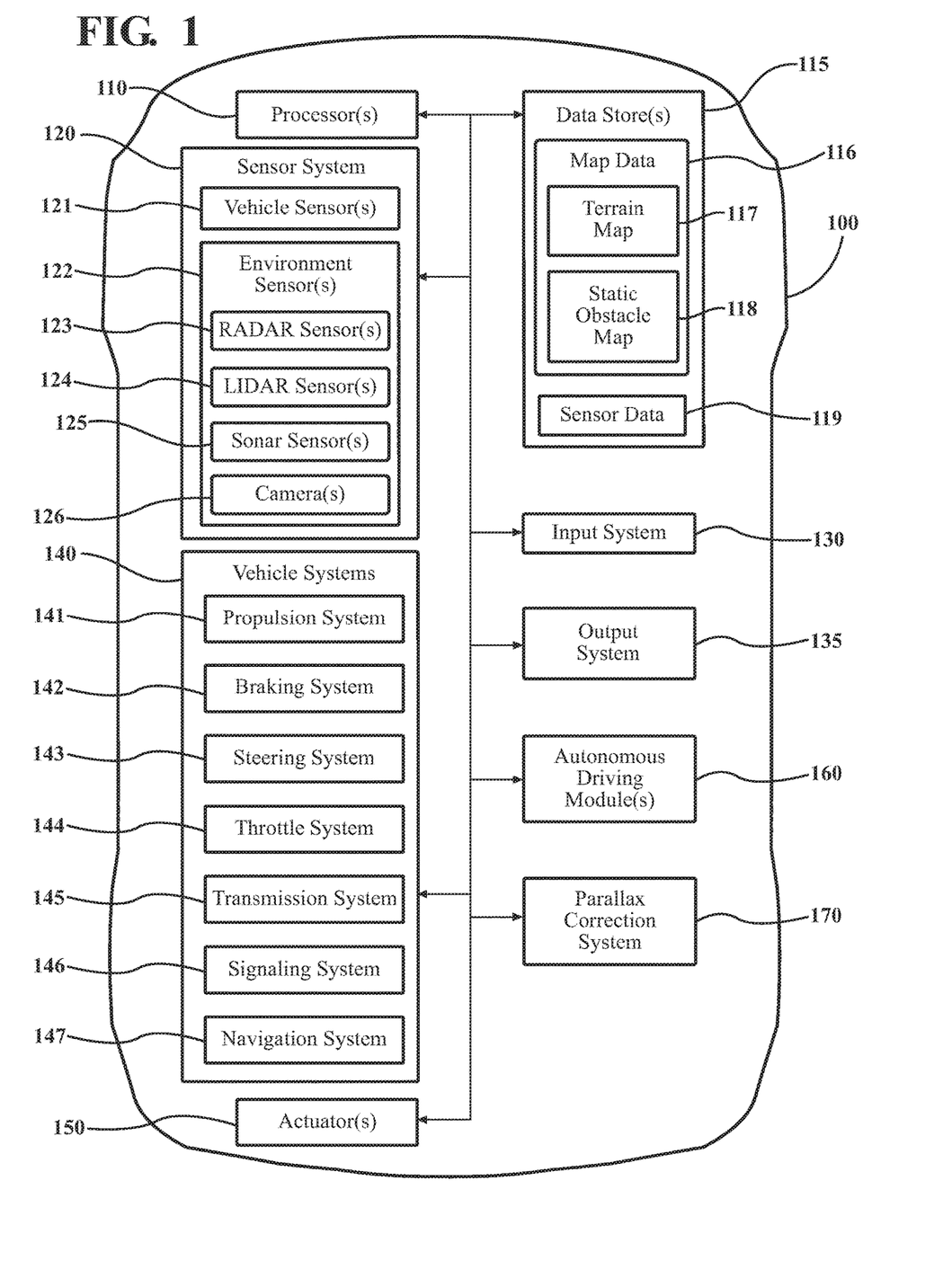
FIG. 1 illustrates one embodiment of a vehicle within which systems and methods disclosed herein may be implemented.

With regards to FIG. 1, a vehicle 100 includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes the parallax correction system 170 that is implemented to correct parallax error. The noted functions and methods will become more apparent with a further discussion of the figures.

Figure 2:
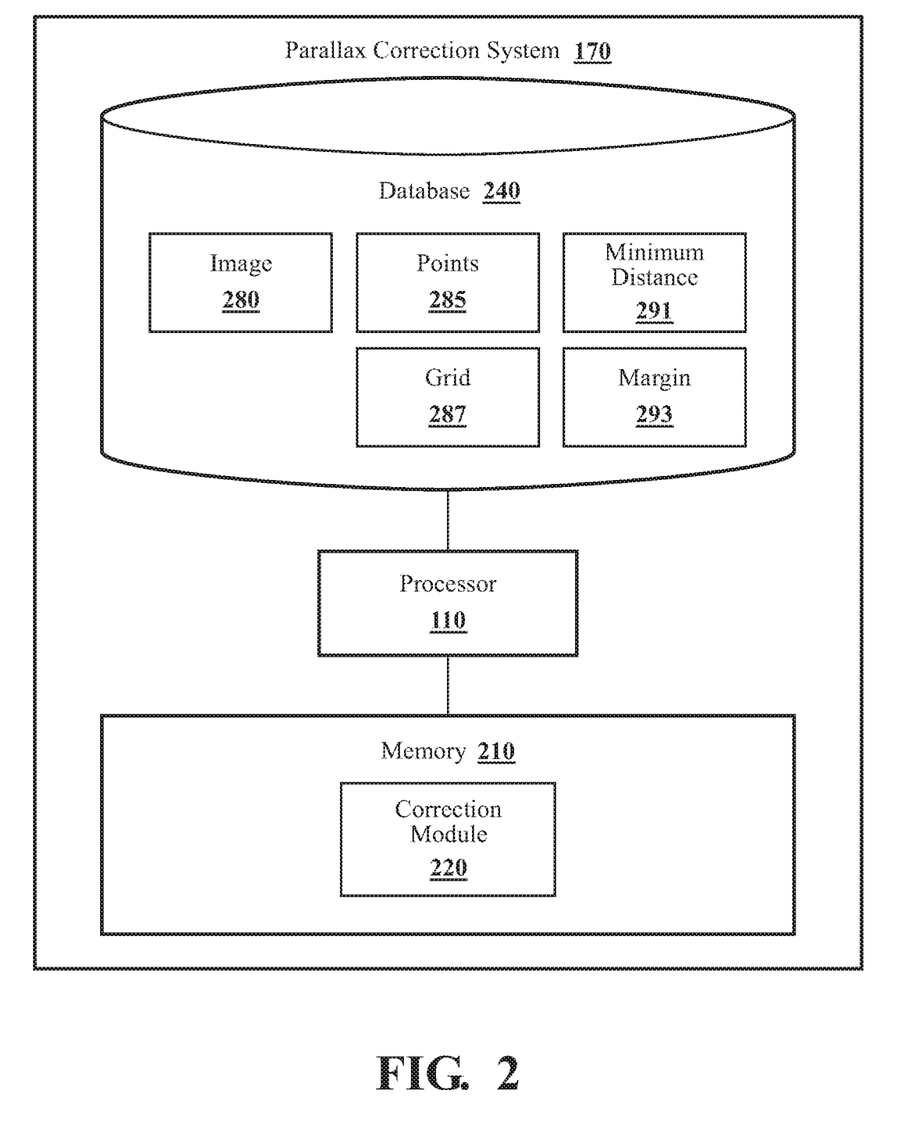
FIG. 2 illustrates one embodiment of a parallax correction system.

With reference to FIG. 2, one embodiment of the parallax correction system 170 of FIG. 1 is further illustrated. The parallax correction system 170 is shown as including a processor 110 from the vehicle 100 of FIG. 1. Accordingly, the processor 110 may be a part of the parallax correction system 170, the parallax correction system 170 may include a separate processor from the processor 110 of the vehicle 100, or the parallax correction system 170 may access the processor 110 through a data bus or another communication path. It should be appreciated, that while the parallax correction system 170 is illustrated as being a single contained system, in various embodiments, the parallax correction system 170 is a distributed system that is comprised of components that can be provided as a centralized server, a cloud-based service, and so on.

In one embodiment, the parallax correction system 170 includes a memory 210 that stores a correction module 220. The memory 210 is a random-access memory (RAM), read-only memory (ROM), a hard-disk drive, a flash memory, or other suitable memory for storing the module 220. The module 220 is, for example, computer-readable instructions that when executed by the processor 110 cause the processor 110 to perform the various functions disclosed herein. Moreover, as previously noted, in various embodiments, one or more aspects of the parallax correction system 170 are implemented as cloud-based services, and so on. Thus, one or more modules of the parallax correction system 170 may be located remotely from other components and may be implemented in a distributed manner.

Furthermore, in one embodiment, the parallax correction system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the module 220 in executing various functions. In one embodiment, the database 240 includes an image 280 along with, for example, other information that is used and/or generated by the module 220 such as points 285, a grid 287, a minimum distance 291, and a margin 293. Of course, in further embodiments, the various information may be stored within the memory 210 or another suitable location.

The correction module 220 is configured to receive a plurality of points 285, and to remove or delete some of the points 285 to reduce parallax error without compromising the accuracy or effectiveness of the points 285 with respect to one or more vehicle functions that may rely on the points 285. Depending on the embodiment, these vehicle functions may include functions such hazard avoidance and navigation. The functions may further include autonomous vehicle related functions performed by the autonomous driving modules 160 of the vehicle 100.

The points 285 may be received by the correction module 220 from one or more LiDAR sensors 124 associated with the vehicle 100. Each point 285 may be associated with a position (i.e., x and y coordinates) and a distance from the particular LiDAR sensor 124 (or the camera 126) that provided the point 285. The points 285 may represent an area or environment around the vehicle 100. Any system or method for generating points 285 from a LiDAR sensor 124 may be used.

The correction module 220 is further configured to receive an image 280. The correction module 220 may receive the image 280 from one or more cameras 126 associated with the vehicle 100. The image 280 may be an image of an area around the vehicle 100. The image 280 may be of the same general area as represented by the points 285. Any type of image 280 may be supported.

The correction module 220 may be configured to project or place the points 285 onto the image 280. Depending on the embodiment, the correction module 220 may place each point 285 onto the image 280 based on the coordinates associated with each point. Any method may be used.

Figure 3:
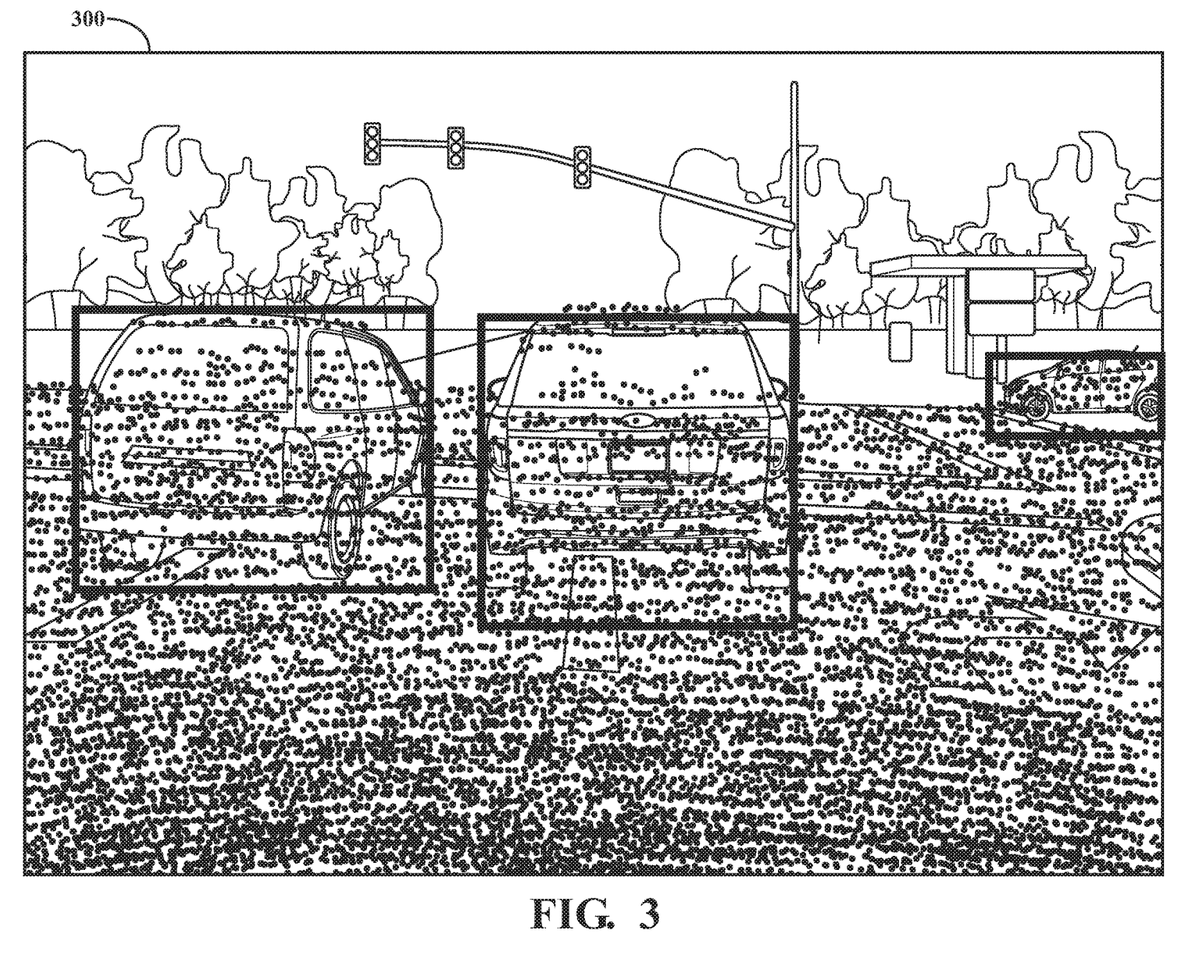
FIGS. 3-4 illustrate example images.

For example, FIG. 3 is an illustration of an example image 300. As shown, the image 300 is a picture of vehicles taken from a camera 126 of a vehicle 100. For purposes of illustration only, bounding boxes generated by a computer vision algorithm are shown surrounding each vehicle in the image 300. Also shown in the image 300 are a plurality of points 285 provided by a LiDAR sensor 124. The points 285 have been projected into the image 300 and are illustrated in the image 300 as black dots.

Returning to FIG. 2, the correction module 220 may be configured to divide the image 280 into a plurality of cells using a grid 287. The size of the cells of the grid 287 may be based on properties of the LiDAR sensor 124 associated with the vehicle 100. As may be appreciated, a LiDAR sensor 124 may include a plurality of lasers that each rotate around at a particular angle. Each laser may be configured to generate a specified number of laser pulses per rotation (each laser pulse may result in one point 285). Each cell in the grid 287 may be sized such that it contains at most one point 285 generated from a particular laser of the LiDAR sensor 124 for a given rotation. Depending on the embodiment, each cell may be approximately the same size, or may have different sizes. The size of each cell may be set by a user or administrator.

As may be appreciated, each cell of the grid 287 may capture or include a plurality of points 285 that have been projected onto the image 280. Each point 285 may be included in one cell of the grid 287, and each cell may include multiple points 285.

Figure 4:
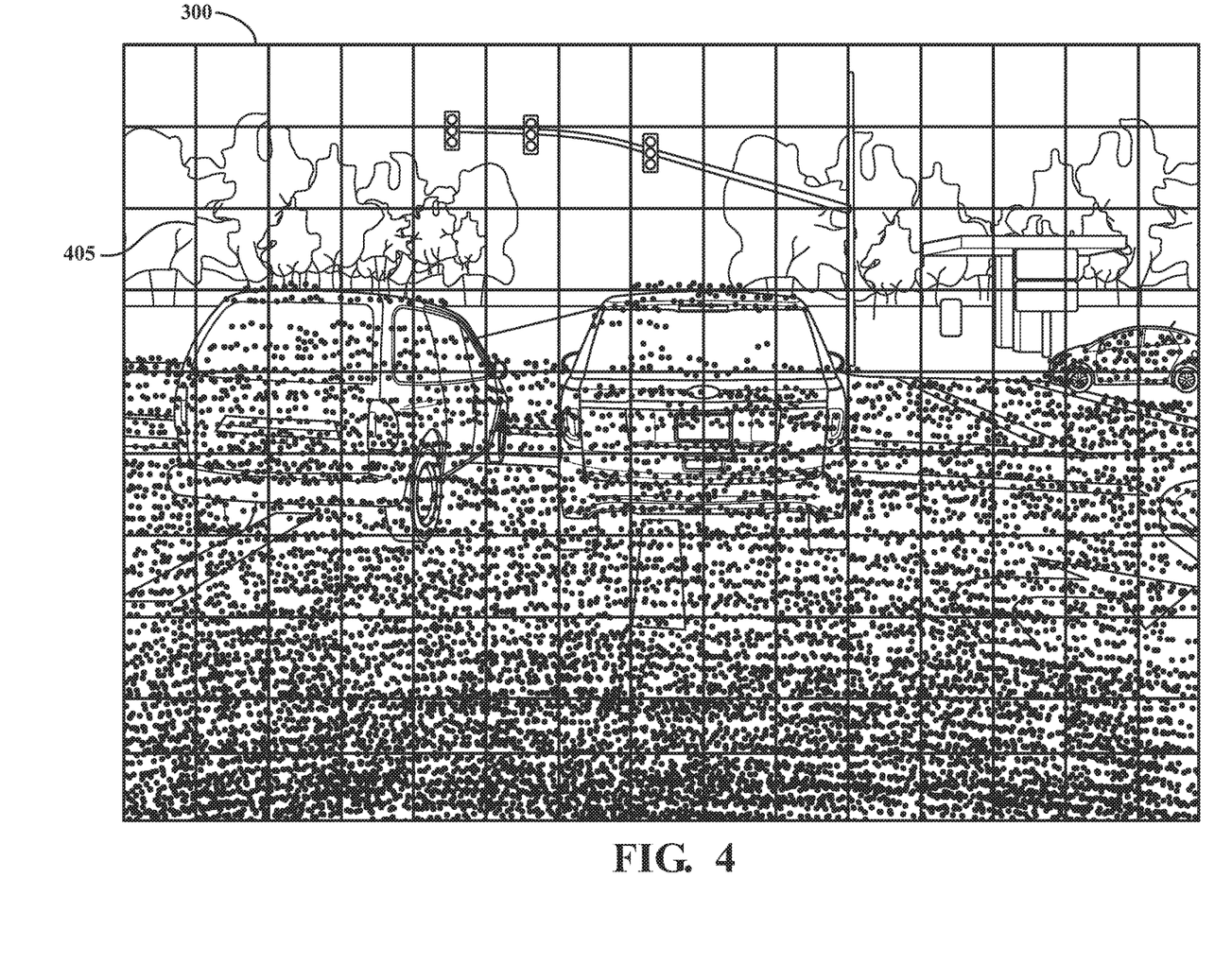

Continuing the example above, in FIG. 4, as shown, a grid 405 has been overlaid on the image 300. The grid 405 includes a plurality of cells and each cell includes subset of the plurality of points 285.

Returning to FIG. 2, the correction module 220 may be configured to determine a minimum distance 291 for each cell of the grid 287. The minimum distance 291 for a cell may be the minimum distance from a point 285 to the camera 126. As described above, each point 285 may have an associated distance from the point 285 to the LiDAR sensor 124. The correction module 220 may determine the distance of a point to the camera 126 based on the distance to the LIDAR sensor 124 and other information such as the relative positions of the camera 126 and LiDAR sensor 124 of the vehicle 100. Other methods for determining the distances may be used.

Accordingly, the correction module 220 may determine the minimum distance 291 for a cell of the grid 287 by first determining the distance from the camera 126 for every point 285 in the cell. The correction module 220 may then determine the minimum distance 291 from among the distances calculated for each point 285. Alternatively, the correction module 220 may determine the distance from some subset of the points 285 in the cell, and may then determine the minimum distance 291 from among the distances calculated for each point 285 in the subset. The points 285 in the subset may be randomly selected, for example. Other methods for calculating the minimum distance 291 for a cell may be used.

The correction module 220 may calculate a margin 293 for each cell. Depending on the embodiment, the margin 293 calculated for a cell may be based, in part, on the minimum distance 291 determined for a cell. In particular, the margin 293 may be inversely related or proportional to the minimum distance 291 such that a smaller minimum distance 291 may result in a larger margin 293, while a larger minimum distance 291 may result in a smaller margin 293.

The correction module 220 may, for each cell, delete or remove points 285 from the cell whose distance from the camera 126 is greater than the sum of the minimum distance 291 determined for the cell and the margin 293 calculated for the cell. Any methods for removing or deleting points 285 may be used.

Generally, points 285 that are farther from the camera 126 are move likely to be misaligned from the image 280, and therefore more likely to cause parallax error. By setting the margin 293 to be inversely related to minimum distance 291, points 285 that are in cells that are far from the camera 126 (i.e., have a large minimum distance 291) are more likely to be removed or deleted from the image 280 than points 285 that are close to the camera 126 (i.e., have a large minimum distance 291). Accordingly, parallax error due to points 285 that are far from the camera 126 is reduced or corrected without removing points 285 that are close to the camera 126.

Figure 5:
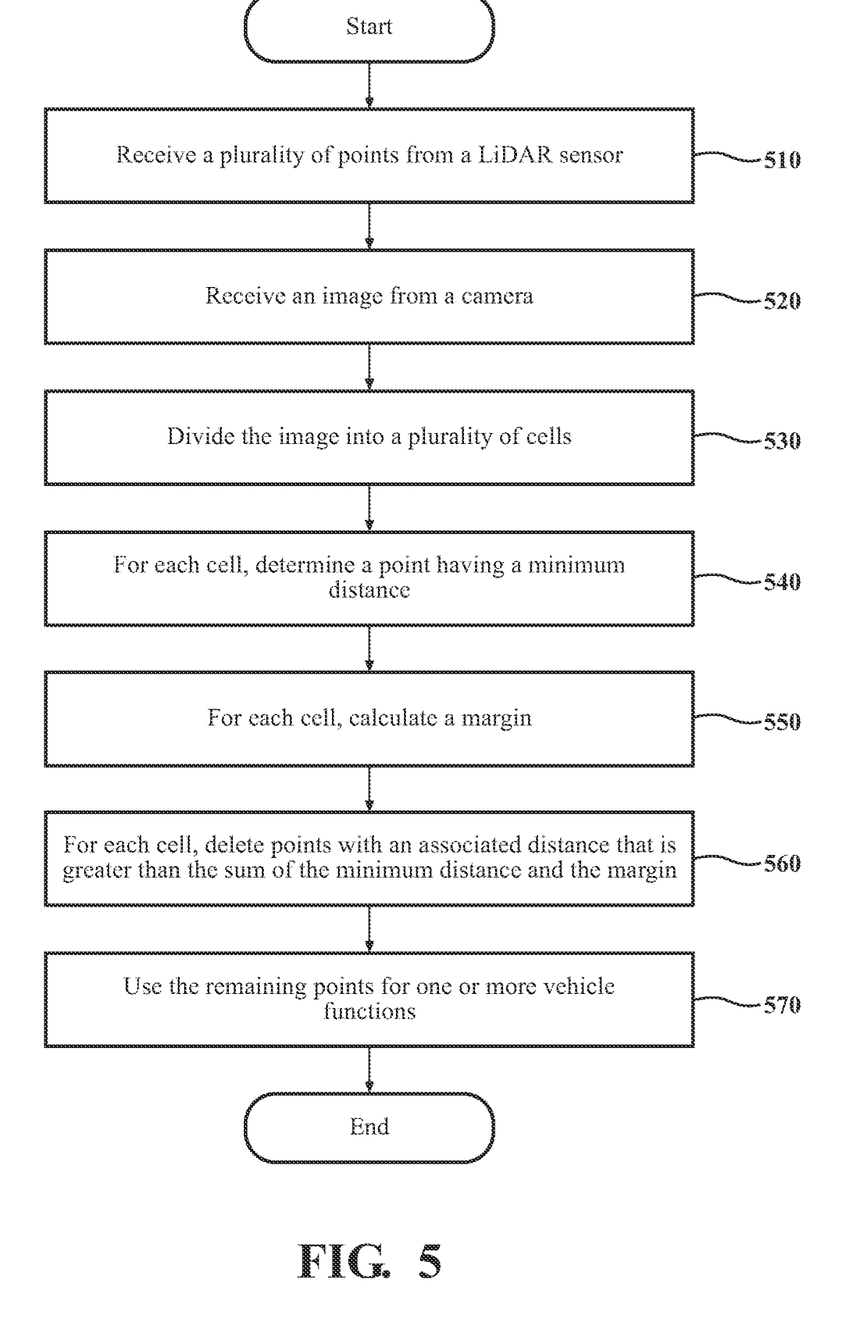
FIG. 5 illustrates a flowchart of a method that is associated with correcting parallax error.

Additional aspects of point removal will be discussed in relation to FIG. 5. FIG. 5 illustrates a flowchart of a method 500 that is associated with removing points 285 from an image 280. The method 500 will be discussed from the perspective of the parallax correction system 170 of FIGS. 1 and 2. While the method 500 is discussed in combination with the parallax correction system 170, it should be appreciated that the method 500 is not limited to being implemented within the parallax correction system 170 but is instead one example of a system that may implement the method 500.

At 510, the correction module 220 receives a plurality of points 285 from a LiDAR sensor 124. Each point may be associated with a position (e.g., x and y coordinates) and a distance. The points 285 may represent a scene or environment of a vehicle 100.

At 520, the correction module 220 receives an image 280 from a camera 126. The image 280 may represent the same scene or environment as the plurality of points 285. The correction module 220 may further merge the image 280 and points 285 by placing or projecting each of the points 285 into the image 280 based on the positions associated with each point 285.

At 530, the correction module 220 divides the image 280 into a plurality of cells. The correction module 220 may divide the image 280 into a plurality of cells using a grid 287. Each cell of the grid 287 may include none or some of the points 285. Each point 285 be included in at most one cell. The size of each cell may be based on properties of the LiDAR sensor 124 such as resolution.

At 540, the correction module 220, for each cell, determines a point 285 associated with the cell having the minimum associated distance. The minimum distance 291 may be the minimum distance from a point 285 in the cell to the camera 126 and/or the LiDAR sensor 124. Any method for calculating the minimum distance 291 of points 285 may be used.

At 550, the correction module 220, for each cell, calculates a margin 293 for the cell. In some embodiments, the margin 293 may be calculated for a cell by the correction module 220 based on the minimum distance 291 determined for the cell. The margin 293 for a cell may be inversely related to the minimum distance 291 determined for the cell. Any method for calculating a margin 293 may be used.

At 560, the correction module 220, for each cell, deletes points 285 from the cell whose associated distances are greater than the sum of the minimum distance 291 and the margin 293 associated with the cell. Any method for deleting points may be used.

At 570, the correction module 220 uses the remaining points 285 as input to one or more vehicle functions. The remaining points 285 may be used along with the image 280. The vehicle functions may include hazard avoidance and navigation. Other vehicle functions may be supported.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LiDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the parallax correction system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the parallax correction system 170, and/or the autonomous driving module(s) 160 may control some or all of these vehicle systems 140 and, thus, may be partially or fully autonomous.

The processor(s) 110, the parallax correction system 170, and/or the autonomous driving module(s) 160 can be operatively connected to communicate with the various vehicle systems 140 and/or individual components thereof. For example, returning to FIG. 1, the processor(s) 110, the parallax correction system 170, and/or the autonomous driving module(s) 160 can be in communication to send and/or receive information from the various vehicle systems 140 to control the movement, speed, maneuvering, heading, direction, etc. of the vehicle 100. The processor(s) 110, the parallax correction system 170, and/or the autonomous driving module(s) 160 may control some or all of these vehicle systems 140.

The processor(s) 110, the parallax correction system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the parallax correction system 170, and/or the autonomous driving module(s) 160 can control the direction and/or speed of the vehicle 100. The processor(s) 110, the parallax correction system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the parallax correction system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for correcting parallax error, comprising:
one or more processors;
a memory communicably coupled to the one or more processors and storing:
a correction module including instructions that when executed by the one or more processors cause the one or more processors to:
receive an image from a camera associated with a vehicle;
receive a plurality of points from a sensor associated with the vehicle, wherein each point of the plurality of points is associated with a position in the image and a distance from the point to one of the sensor and the camera;
divide the image into a plurality of cells, wherein each point of the plurality of points is associated with a cell of the plurality of cells based on the position of the point in the image;
for each cell of the plurality of cells, determine a point associated with the cell having a minimum distance for the cell;
for each cell of the plurality of cells, calculate a margin for the cell based on the minimum distance for the cell;
for each cell of the plurality of cells, delete points associated with the cell whose associated distance is greater than the minimum distance for the cell plus the margin for the cell, wherein such a deletion reduces the parallax error between the image and the plurality of points; and
use the points associated with the cells of the plurality of cells for one or more vehicle functions.

2. The system of claim 1, wherein the one or more vehicle functions include hazard avoidance and navigation.

3. The system of claim 1, wherein the vehicle is an autonomous vehicle.

4. The system of claim 1, wherein the margin for the cell is inversely related to the minimum distance for the cell.

5. The system of claim 1, wherein the distance associated with a point is a distance from the point to the camera.

6. The system of claim 1, wherein the instructions to use the points associated with the cells of the plurality of cells for the one or more vehicle functions comprise instructions to use the points associated with the cells of the plurality of cells and the image for the one or more vehicle functions.

7. The system of claim 1, wherein the sensor is a LiDAR sensor.

8. A method for correcting parallax error, comprising:
receiving an image from a camera associated with a vehicle;
receiving a plurality of points from a sensor associated with the vehicle, wherein each point of the plurality of points is associated with a position in the image and a distance from the point to one of the sensor and the camera;

dividing the image into a plurality of cells, wherein each point of the plurality of points is associated with a cell of the plurality of cells based on the position of the point in the image;

for each cell of the plurality of cells, determining a point associated with the cell having a minimum distance for the cell;

for each cell of the plurality of cells, calculating a margin for the cell based on the minimum distance for the cell;

for each cell of the plurality of cells, deleting points associated with the cell whose associated distance is greater than the minimum distance for the cell plus the margin for the cell, wherein such a deletion reduces the parallax error between the image and the plurality of points; and using the points associated with the cells of the plurality of cells for one or more vehicle functions.

9. The method of claim 8, wherein the one or more vehicle functions include hazard avoidance and navigation.

10. The method of claim 8, wherein the vehicle is an autonomous vehicle.

11. The method of claim 8, wherein the margin for the cell is inversely related to the minimum distance for the cell.

12. The method of claim 8, wherein the distance associated with a point is a distance from the point to the camera.

13. The method of claim 8, wherein the using the points associated with the cells of the plurality of cells for the one or more vehicle functions comprises using the points associated with the cells of the plurality of cells and the image for the one or more vehicle functions.

14. The method of claim 8, wherein the sensor is a LiDAR sensor.

15. A non-transitory computer-readable medium for correcting parallax error including instructions that when executed by one or more processors cause the one or more processors to:

receive an image from a camera associated with a vehicle;

receive a plurality of points from a sensor associated with the vehicle, wherein each point of the plurality of points is associated with a position in the image and a distance from the point to one of the sensor and the camera;

divide the image into a plurality of cells, wherein each point of the plurality of points is associated with a cell of the plurality of cells based on the position of the point in the image;

for each cell of the plurality of cells, determine a point associated with the cell having a minimum distance for the cell;

for each cell of the plurality of cells, calculate a margin for the cell based on the minimum distance for the cell;

for each cell of the plurality of cells, delete points associated with the cell whose associated distance is greater than the minimum distance for the cell plus the margin for the cell, wherein such a deletion reduces the parallax error between the image and the plurality of points; and using the points associated with the cells of the plurality of cells for one or more vehicle functions.

16. The computer-readable medium of claim 15, wherein the one or more vehicle functions include hazard avoidance and navigation.

17. The computer-readable medium of claim 15, wherein the vehicle is an autonomous vehicle.

18. The computer-readable medium of claim 15, wherein the margin for the cell is inversely related to the minimum distance for the cell.

19. The computer-readable medium of claim 15, wherein the distance associated with a point is a distance from the point to the camera.

20. The computer-readable medium of claim 15, wherein the sensor is a LiDAR sensor.

* * * * *